(12) United States Patent
Kiris

(10) Patent No.: US 8,832,346 B2
(45) Date of Patent: Sep. 9, 2014

(54) DATA PACKING AND UNPACKING ENGINE

(75) Inventor: Cahide Kiris, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 634 days.

(21) Appl. No.: 10/462,152

(22) Filed: Jun. 16, 2003

(65) Prior Publication Data

US 2004/0255072 A1    Dec. 16, 2004

(51) Int. Cl.
    *G06F 13/36*      (2006.01)
    *G06F 13/40*      (2006.01)

(52) U.S. Cl.
    USPC .......................... 710/306; 710/307; 710/310

(58) Field of Classification Search
    USPC ......................................... 710/307, 306, 310
    See application file for complete search history.

(56) References Cited

U.S. PATENT DOCUMENTS

| | | | |
|---|---|---|---|
| 5,613,078 A * | 3/1997 | Kishigami | 710/307 |
| 5,825,784 A * | 10/1998 | Spaderna et al. | 714/724 |
| 6,526,470 B1 * | 2/2003 | Cress et al. | 710/307 |
| 6,742,063 B1 * | 5/2004 | Hellum et al. | 710/66 |
| 6,754,760 B1 * | 6/2004 | Yee et al. | 710/307 |
| 6,754,873 B1 * | 6/2004 | Law et al. | 715/501.1 |
| 6,910,092 B2 * | 6/2005 | Calvignac et al. | 710/310 |
| 6,954,873 B2 * | 10/2005 | Jain | 713/500 |
| 7,043,592 B2 * | 5/2006 | Nagano | 710/307 |
| 2002/0194418 A1 * | 12/2002 | Nishtala et al. | 710/307 |
| 2003/0145149 A1 * | 7/2003 | Nagano | 710/307 |

\* cited by examiner

*Primary Examiner* — Paul R Myers
*Assistant Examiner* — Christopher a Daley

(57) ABSTRACT

Systems and methods are disclosed to transfer data between a first bus internal to a system-on-chip (SOC) device and a second bus external to the SOC device, each bus having a plurality of bus segments shared among a plurality of peripheral devices communicating over one or more bus segments. When reading data from a peripheral device, the system packs data by enabling each effected first bus data segment in sequence until requested data is packed; and when writing data to a peripheral device, the system unpacks data by enabling each effected second bus data segment in sequence until requested data is unpacked.

16 Claims, 4 Drawing Sheets

DATA PACKING AND UNPACKING ENGINE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention relates to data transfer.

Wireless data services now enable a new generation of high-performance, low-power-consumption mobile devices to access network-centric applications and content anywhere, anytime. Handheld devices include personal digital assistants (PDAs), email companions, and other data-centric mobile products such as Palm OS, Symbian, and Pocket PC products. The main functionality of such devices has been for personal information manager (PIM) applications. But as more of these devices get network connectivity options, applications such as voice and email are becoming important. Additionally, next-generation mobile phones are hybrid devices that extend the voice-centric nature of current generation (2 G) handsets. These devices are connected to packet-based networks, which deliver data-services in addition to voice-services. Handsets connected to 2.5 G networks such as GPRS and PHS allow always-on data network connection. This enables further proliferation of multimedia- and graphics-based applications in the consumer segment of this market. 3 G Handsets have been designed from the ground up to interface to high-speed, packet-based networks that deliver speeds from 20 Kbps to 2 Mbps. These handsets, in addition to the features of 2.5 G phones, have the capability to support 2-way video, share pictures and video clips, use location-based information, provide a rich web experience and support next-generation server-based applications for business like always-on email.

As mobile applications become richer and more complex, the ability to optimally process multimedia becomes a necessity on mobile devices such as PDAs and smart-phones. Applications such as video mail, mapping services, reading PDF files, and graphics-rich games all require high performance graphics and multimedia capabilities. These capabilities enable new applications that benefit from rich images and system performance in ways that were previously unavailable to most handheld users. These mobile devices face the challenge of providing a compelling user experience while reducing overall system energy consumption and cost.

To reduce cost, system-on-chip (SOC) solutions have appeared. The SOC solutions integrate various circuits such as a memory controller, a hard disk controller, a graphics/video controller, a communications controller, and other peripheral controllers such as serial and USB onto a single device. A clock signal is used to synchronize data transfers between circuits. The circuits also communicate over a central bus. Processing performance is influenced in part by the width of a data bus that transfers data between components within the SOC device and external devices such as memory. A data width is typified by, for example, 8 bits, 16 bits, 32 bits, 64-bits and 128 bits, which are a power of 2. If a large data bus width is adopted, data transfer capacity is increased for memory intensive applications. However, a large data bus width increases the number of wiring conductors for physically connecting the data bus among the SOC devices and the overall size of the system is inevitably increased. Additionally, many peripherals such as serial ports and USB ports do not need high data transfer rate and typically communicate over 8-bit or 16-bit buses.

Since each SOC device has a number of components that must communicate with each other, a system for packing and unpacking data from components or peripherals with varying bus widths is needed. Alignment is important for functional reasons because an unaligned data access may cause a bus error resulting in a system crash. Alignment is also important for performance reasons because unaligned data access, which can be handled with hardware or software alignment correction tools, will likely become more expensive as processor speeds continue to increase.

Data stored in memory or disk is typically heterogeneous, in the sense that it consists of elements with varying alignment requirements. The storage space allocated for the data, in the absence of alignment requirements, can be optimized by packing the elements one after another. Data packing and unpacking are frequently used procedures when there are transfers between devices with different data bus widths. However, imposing alignment requirements on the data elements may force the introduction of padding to fill holes in storage caused by the alignment requirements. This padding may increase the amount of storage required to store the data elements. The amount of storage required to store the data elements may depend on the order in which the data elements are arranged in storage. This is because the padding necessary to accommodate the data alignment requirements may be different depending on the order that the data elements are stored.

SUMMARY

Systems and methods are disclosed to perform data packing and unpacking. A power efficient approach minimizing overall cost is used for data packing and unpacking in the read and write path of the external bus interface module of a system-on chip solution. The external bus is shared among different type of memories/devices with different data bus width. The system utilizes gated clocks for the packing and unpacking of data.

The system conserves power by driving only the effected data bus segment of the external shared data bus in case of write accesses. It conserves the power by enabling the relative segment of the data bus, and holding it to pack the captured data up-to 32 bits. The write out data bus is divided into four-data segments; each is 8 bit. The external memories are sharing the same bus (sharing all or segments of it). The supported external bus width is 32 bit. The memories less than 32 bit data bus width can be driving upper or lower bits of the shared bus (specified by register programming or boot mode option). The supported bus sizes for the memories 8, 16, or 32 bits. The unpacking logic controls the generation of the gated clock enables by taking the width, location, and the least significant bits of the address for the targeted external memory, also by taking into account the size of the requested signal. Only the desired data segments are driven by enabling the related clock (each clock controls flip-flops, for example synchronous D flip-flops). Most of the internal requests are 32 bit requests. When 32 bit read accesses are requested from the memories with $8/16$ bit, the data packing logic enables the effected internal data segment; this is done in a sequence until the requested data is packed and ready to be latched by the originator.

The advantages of the approach can be summarized as following. The system eliminates the data hold multiplexing (hereinafter muxing) logic for data packing. When data is captured 8 bit or 16 bit at a time in a sequence to form 32 bit internal data, some muxing logic is needed to hold the previously captured data segment(s). Instead of using muxes and flip-flops, flip-flops triggered by gated clocks are used. The clocks are enabled in sequence according to the least significant bits of the start address and the data bus size of the target memory.

Other advantages include performing packing and unpacking operations in real time while requiring minimal hardware resources. The system provides compatibility and wiring space minimization and allows the re-use of peripheral cores in their original bus widths. The system also supports efficient data transfer among diverse peripherals with different bus widths. When data having different bit widths (for example, 8/16/32 bits) is transferred over a wide bus (such as a 32-bit width, for example), wasteful power consumption is minimized for circuits supporting the unused portion of the wide data bus. Other advantages include a compact implementation and the sharing of many operations using the same circuitry to allow space reduction while maintaining a highly efficient algorithm. A power efficient implementation is achieved.

BRIEF DESCRIPTION OF THE FIGURES

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION

Figure 1:
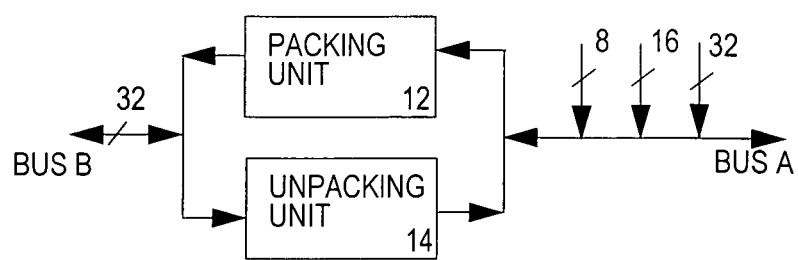
FIG. 1 shows one implementation of a data packing and unpacking device.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in the area involving a graphics/display controller, it is to be appreciated that the present invention is also applicable to any application involving multiple data paths such as communications, core logic, central processing units (CPU), and others.

Referring now to the drawings in greater detail, there is illustrated therein structure diagrams for processes that a system will utilize to pack and unpack data accesses, as will be more readily understood from a study of the diagrams.

Referring now made to FIG. 1, a block diagram illustrating a 32-bit data packing/unpacking engine is shown. In the embodiment of FIG. 1, a four byte-wide packing unit 12 communicates data from a bus A to a bus B. Correspondingly, a four byte-wide unpacking unit 14 handles data transfers from the bus B to the bus A. The packing unit 12 receives data generated by any byte-wide peripheral connected to any arbitrary byte 0-3 on the bus A and transfers the byte to any arbitrary byte on the bus B. The packing unit 12 also receives data generated by any short word peripheral connected to any contiguous two bytes on the bus A and transfers the short-word to any arbitrary contiguous two bytes on the bus B.

Correspondingly, the unpacking unit 14 transfers any arbitrary byte 0-3 from the bus B to any arbitrary position on the bus A. For short-word transfers, the unpacking unit 14 transfers any arbitrary contiguous pairs of bytes from the bus B to any arbitrarily selected pair of bytes on the bus A.

Figure 2:
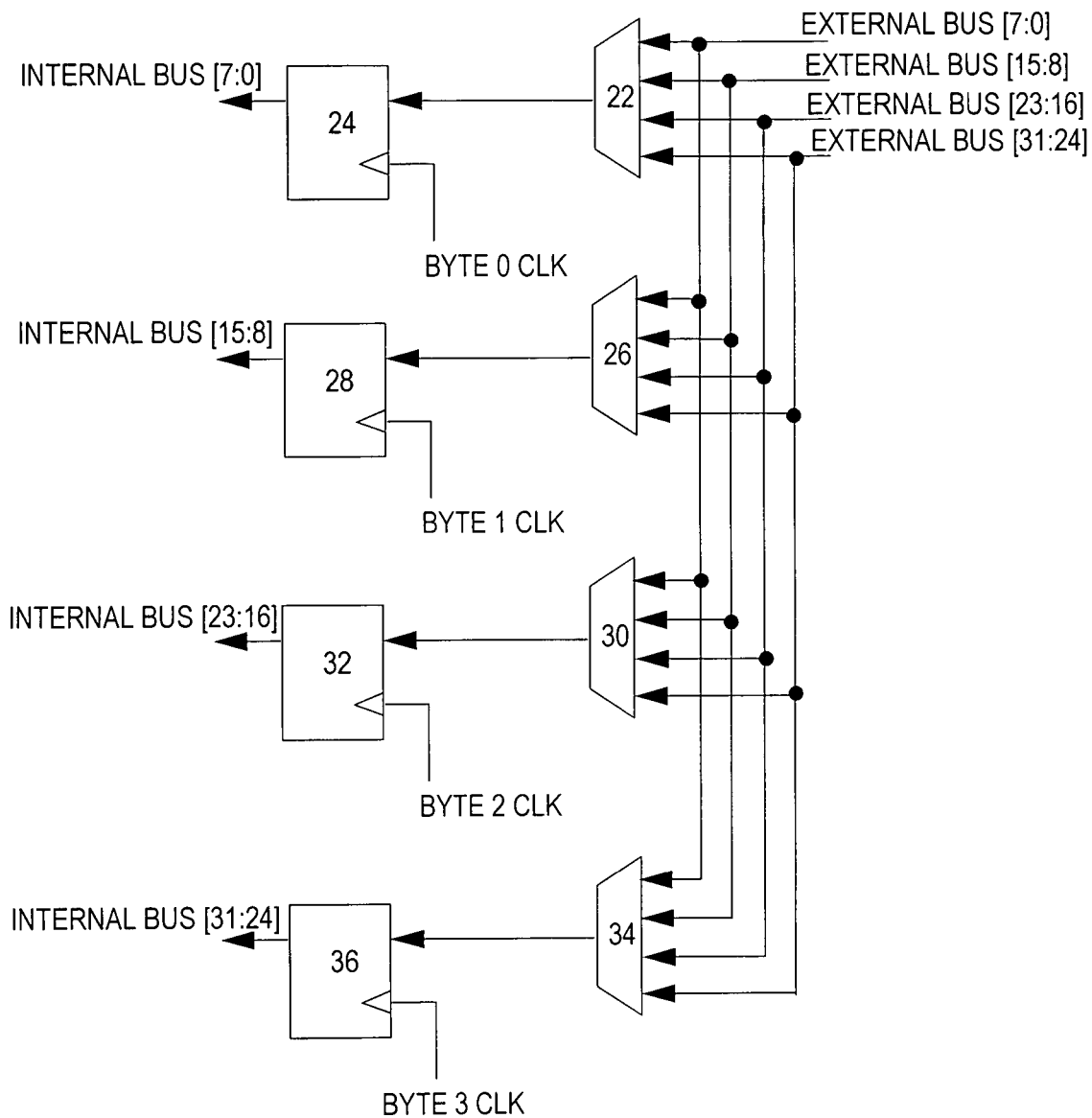
FIG. 2 shows an exemplary read packing unit.

Referring now to FIG. 2, an exemplary read packing unit 12 is shown. Four byte-wide flip-flops have their outputs connected to bytes 0-byte 3 of the internal bus B, respectively. Each flip-flop 24, 28, 32 or 36 is individually clocked. A plurality of multiplexers 22, 26, 30 and 34 are connected to bytes 0-3 of the bus A and adapted to move data from any byte of bus A to any arbitrary byte on the bus B. The multiplexer 22 drives the input of a byte-wide flip-flop 24. The output of the flip-flop 24 drives byte 0 of the internal bus B. Correspondingly, the multiplexer 26 drives the input of a byte-wide flip-flop 28. The output of the flip-flop 28 drives byte 1 of the internal bus B. The multiplexer 30 drives the input of a byte-wide flip-flop 32. The output of the flip-flop 32 drives byte 2 of the internal bus B. Additionally, the multiplexer 34 drives the input of a byte-wide flip-flop 36, whose output drives byte 3 of the internal bus B. Each of the flip-flops 24, 28, 32 and 36 is clocked by a clock signal BYTE0CLK, BYTE1CLK, BYTE2CLK, and BYTE3CLK, respectively.

In FIG. 2, an 8-bit device on the external bus A can communicate over any byte of bus A. Thus, it can communicate data over byte 0 (bits 7:0), byte 1 (bits 15:8), byte 2 (bits 23:16) or byte 3 (bits 31:24). Correspondingly, a 16-bit device connected to the external bus A can communicate over any 16-bit word of bus A (bits 15:0, 23:7 or 31:16).

The read packing unit 12 is highly flexible in that it can place the output of any byte-wide external device to any byte on the internal bus B. Also, the read packing unit 12 can place the output of any short word-wide external device onto any two consecutive bytes on the internal bus B.

Next, exemplary operations of the circuit of FIG. 2 are discussed:

8-Bit Peripheral Connected to the First Byte (Bits 7:0) of the External Bus A.

In case 1, an internal requester such as a processor 101 (FIG. 4) or a DMA controller 108 (FIG. 3) (FIG. 4) connected to the internal bus B can read 32-bits of data. In this case, the packing unit 12 selects the first byte (bits 7:0) of the external bus A and enables the byte clocks BYTE0CLK, BYTE1CLK, BYTE2CLK, and BYTE3CLK, one at a time, until four bytes of data are packed into a single 32-bit word for reading by the internal requester.

In case 2, the internal requester needs 16-bits of data. The packing unit 12 selects the first byte (bits 7:0) of the external bus A and enables the byte clocks BYTE0CLK, BYTE1CLK sequentially until two bytes of data are packed into a 16-bit word for reading by the internal requester.

In case 3, the internal requester needs 8-bits of data. The packing unit 12 selects the first byte (bits 7:0) of the external bus A and enables the byte clock BYTE0CLK whenever the data from the external peripheral connected on the external bus A is ready to transfer data.

In case 4, the internal requester needs 16-bits of data. The packing unit 12 selects the first byte (bits 7:0) of the external bus A and enables the byte clocks BYTE2CLK, BYTE3CLK sequentially until two bytes of data are packed into a 16-bit word for reading by the internal requester.

In case 5, the internal requester needs 8-bits of data. The packing unit 12 selects the first byte (bits 7:0) of the external bus A and enables the byte clock BYTE1CLK whenever the data from the external peripheral connected on the external bus A is ready to transfer data.

In case 6, the internal requester needs 8-bits of data. The packing unit 12 selects the first byte (bits 7:0) of the external bus A and enables the byte clock BYTE2CLK whenever the data from the external peripheral connected on the external bus A is ready to transfer data.

In case 6, the internal requester needs 8-bits of data. The packing unit 12 selects the first byte (bits 7:0) of the external bus A and enables the byte clock BYTE3CLK whenever the data from the external peripheral connected on the external bus A is ready to transfer data.

8-Bit Peripheral Connected to the Second Byte (Bits 15:8) of the External Bus A.

In this case, the internal requester on the internal bus B can read 32-bits of data. In this case, the packing unit 12 selects the second byte (bits 15:8) of the external bus A and enables the byte clocks BYTE0CLK, BYTE1CLK, BYTE2CLK, and BYTE3CLK, one at a time, until four bytes of data are packed into a single 32-bit word for reading by the internal requester.

In the case where the internal requester can handle 16-bits of data, the packing unit 12 selects the second byte (bits 15:8) of the external bus A and enables the byte clocks BYTE1CLK, BYTE2CLK sequentially until two bytes of data are packed into a 16-bit word for reading by the internal requester.

In the case where the internal requester can handle 16-bits of data, the packing unit 12 selects the second byte (bits 15:8) of the external bus A and enables the byte clocks BYTE2CLK, BYTE3CLK sequentially until two bytes of data are packed into a 16-bit word for reading by the internal requester.

In the next case where the internal requester needs 8-bits of data, the packing unit 12 selects the second byte (bits 15:8) of the external bus A and enables the byte clock BYTE1CLK whenever the data from the external peripheral connected on the external bus A is ready to transfer data.

In the next case where the internal requester needs 8-bits of data, the packing unit 12 selects the second byte (bits 15:8) of the external bus A and enables the byte clock BYTE2CLK whenever the data from the external peripheral connected on the external bus A is ready to transfer data.

In the next case where the internal requester needs 8-bits of data, the packing unit 12 selects the second byte (bits 15:8) of the external bus A and enables the byte clock BYTE3CLK whenever the data from the external peripheral connected on the external bus A is ready to transfer data.

Figure 3:
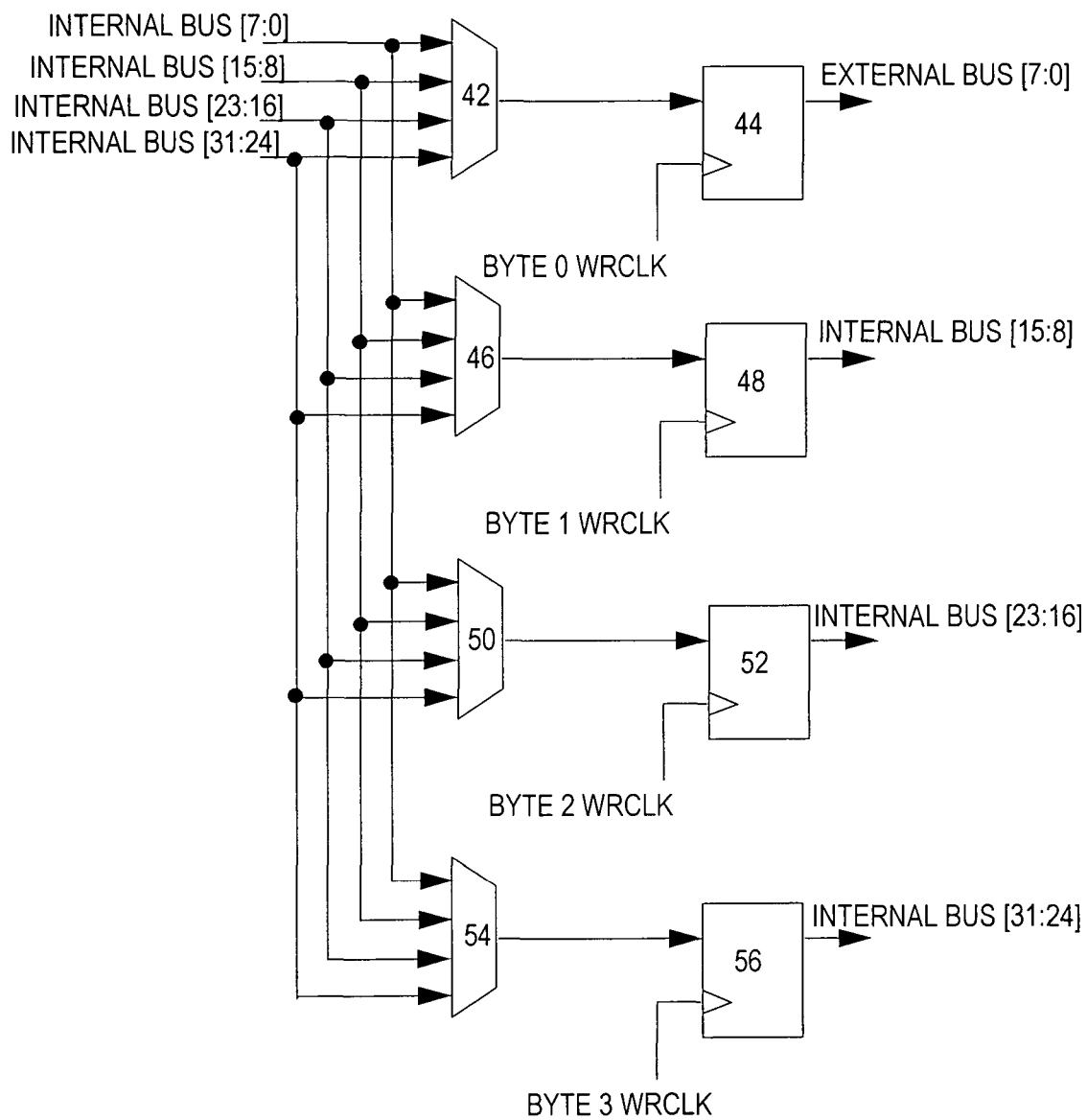
FIG. 3 shows an exemplary write unpacking unit.

Turning now to FIG. 3, an exemplary unpacking unit 14 is shown. Four byte-wide multiplexers 42, 46, 50 and 54 have their outputs connected to bytes 0-byte 3 of the internal bus B, respectively. The multiplexers 42, 46, 50 and 54 are adapted to move data from any byte of bus B to the input of byte-wide flip-flops 44, 48, 52 and 56, respectively. Each flip-flop 44, 48, 52 or 56 is individually clocked. The multiplexer 42 drives the input of a byte-wide flip-flop 44. The output of the flip-flop 44 drives byte 0 of the external bus A. Correspondingly, the multiplexer 46 drives the input of a byte-wide flip-flop 48. The output of the flip-flop 48 drives byte 1 of the external bus A. The multiplexer 50 drives the input of a byte-wide flip-flop 52. The output of the flip-flop 52 drives byte 2 of the external bus A. Additionally, the multiplexer 54 drives the input of a byte-wide flip-flop 56, whose output drives byte 3 of the external bus A. Each of the flip-flops 44, 48, 52 and 56 is clocked by a clock signal BYTE0WRCLK, BYTE1WRCLK, BYTE2WRCLK, and BYTE3WRCLK, respectively.

In the embodiment of FIG. 3, an internal data generator such as the processor 101 or the DMA engine 108 can write to an 8-bit device that is arbitrarily connected to any byte 0 . . . 3 of the external bus A. Alternatively, the internal data generator can write to any 16-bit device that is connected to two consecutive bytes of the external bus A.

An exemplary process for correspondingly unpacking data from bus B to bus A is discussed next. In this process, a 32-bit word entry is read from external memory. When the output from bus B is valid, the processor 101 (FIG. 4) enables one or more of the multiplexers 42, 46, 50 and 54 to appropriately route the particular byte from bus B onto the appropriate position on bus A. Next, exemplary operations of the circuit of FIG. 3 are discussed:

8-Bit Peripheral Connected to the First Byte (Bits 7:0) of the External Bus A.

In one case, an internal data generator such as the processor 101 or the DMA controller 108 connected to the internal bus B can write 32-bits of data. In this case, the unpacking unit 14 selects the first byte (bits 7:0) of the external bus A and enables the write clock BYTE0WRCLK, selects the second byte (bits 15:8) of the external bus A and enables the write clock BYTE0WRCLK, selects the third byte (bits 23:16) of the external bus A and enables the write clock BYTE0WRCLK, and selects the fourth byte (bits 31:24) of the external bus A and enables the write clock BYTE0WRCLK, one at a time, until four bytes of data are unpacked into a single byte for transmission to the external 8-bit external device by the internal data generator.

In another case, the internal data generator writes 16-bits of data. The unpacking unit 14 selects the first byte (bits 7:0) of the external bus A and enables the byte clocks BYTE0WRCLK. Next, the unpacking unit 14 selects the second byte (bits 15:8) of the external bus A and enables BYTE0WRCLK such that two bytes of data are unpacked into a byte for transmission to the 8-bit external device by the internal data generator.

8-Bit Peripheral Connected to the Third Byte (Bits 23:16) of the External Bus A.

In this case, an internal data generator such as the processor 101 or the DMA controller 108 connected to the internal bus B can write 32-bits of data. In this case, the unpacking unit 14 selects the first byte (bits 7:0) of the external bus A and enables the write clock BYTE2WRCLK, selects the second byte (bits 15:8) of the external bus A and enables the write clock BYTE2WRCLK, selects the third byte (bits 23:16) of the external bus A and enables the write clock BYTE2WRCLK, and selects the fourth byte (bits 31:24) of the external bus A and enables the write clock BYTE2WRCLK, one at a time, until four bytes of data are unpacked into a single byte for transmission to the 8-bit external device by the internal data generator.

16-Bit External Device Connected to the Bits 31:16 of the External Bus A.

The unpacking unit 14 selects the first byte (bits 7:0) of the external bus A and enables the byte clock BYTE2WRCLK. At the same time, the unpacking unit 14 also selects the second byte (bits 15:8) of the external bus A and enables BYTE3WRCLK such that four bytes of data are unpacked into a short word for transmission to the external 16-bit peripheral device. To complete the rest of the 32-bit unpack, the unpacking unit 14 selects the third byte (bits 23:16) and enables BYTE2WRITECLK. Additionally (or at the same time), the unpacking unit 14 also selects the fourth byte (bits 31:24) and enables BYTE3WRITECLK.

Figure 4:
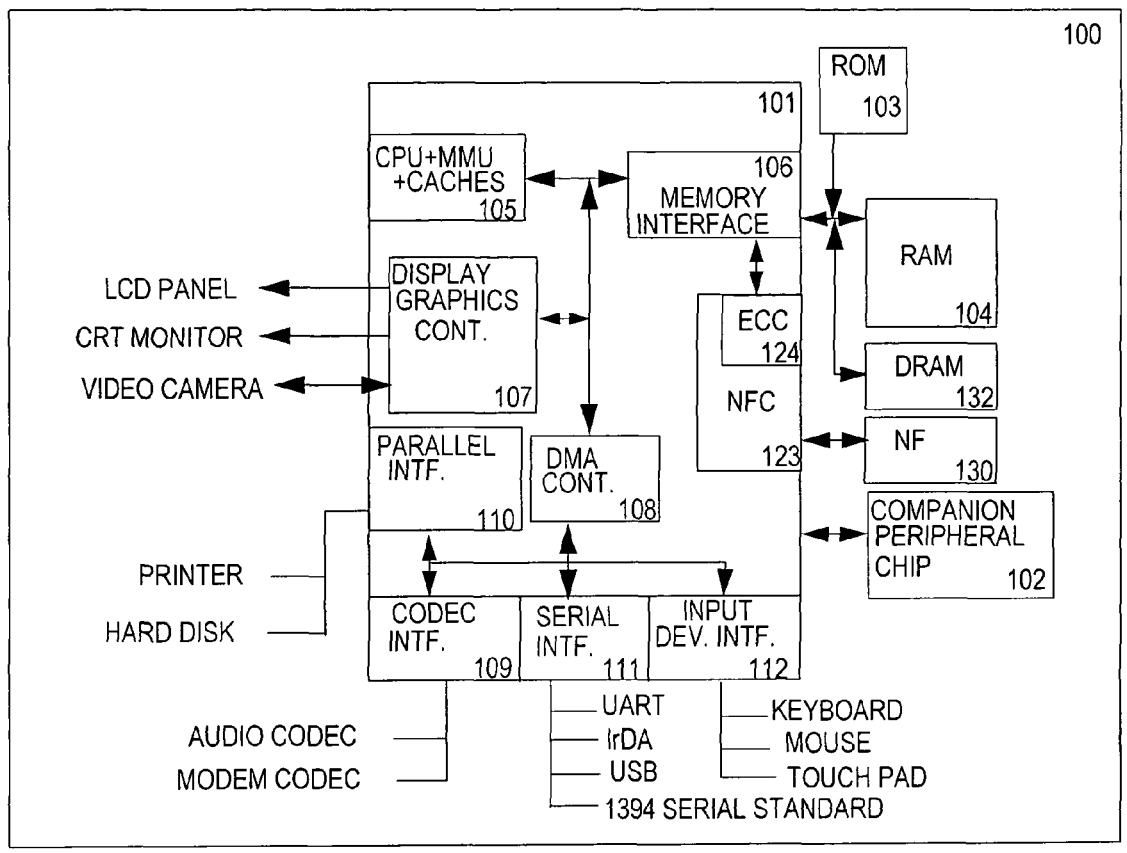
FIG. 4 shows a computer system used with the data packing and unpacking device.

Reference is now made to FIG. 4 which illustrates, for example, a high-level diagram of computer system 100 upon which the present invention may be implemented or practiced. More particularly, computer system 100 may be a laptop or hand-held computer system. It is to be appreciated that computer system 100 is exemplary only and that the present invention can operate within a number of different computer systems including desk-top computer systems, general purpose computer systems, embedded computer systems, and others.

In FIG. 4, computer system 100 is a highly integrated system which includes of integrated processor circuit 101, peripheral controller 102, read-only-memory (ROM) 103, and random access memory (RAM) 104. The highly integrated architecture allows power to be conserved. Computer system architecture 100 may also include a peripheral controller if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 1131, and input device interface 112. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as universal asynchronous receiver transmitter (UART) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. The memory interface 106 provides the unpacking/packing functions of FIG. 1.

Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

In one embodiment, digital system 100 includes an ECC processor (EP) 124 that communicates with DMA controller 108 and memory interface 106. In another embodiment, DMA controller 108 is part of a NAND-flash controller that further includes the ECC processor. DMA controller 108 moves data from a peripheral device, such as a flash memory card, directly to system memory without requiring the involvement of CPU 105. The DMA controller 108 allows the system to continue processing other tasks while new data is being retrieved. ECC processor 124 performs ECC related operations to compensate for errors caused by defects and to maintain data integrity. ECC processor 124 also provides status information to Error Correction software which may be stored in ROM 103 and executed by CPU 105 to facilitate error correction and also provides an appropriate indication of the existence of errors.

Memory interface 106 is fed by and electrically connected to DMA controller 108 and ECC processor 124. Memory interface 106 drives a communications bus that feeds RAM 104 that can include DRAM 132. A NAND-Flash Controller (NFC) 123 drives a NAND-Flash (NF) memory 130. Memory interface 106 performs the standard interface functions, such as code conversion, protocol conversion, and buffering, required for communications to and from a peripheral. Memory interface 106 allows a number of independent devices with varying protocols to communicate with each other. NF 130 is representative of any well-known NAND-flash memory, which is an electrically erasable, non-volatile memory device that retains its data even after the power is removed. NAND-flash memory devices are well-suited for cellular phones, digital music players, hand-held computers, digital cameras, camcorders, and digital voice recorders, where performance is critical.

The above system can perform the real-time image capture/compression/display process within a hand-held device such as a PDA or a cellular phone that takes advantage of the data packing and unpacking operations. In this case, a liquid crystal display (LCD) can have a 16-bit interface, the processor can have a 32-bit that interfaces with application-specific integrated circuit (ASIC), and a video camera that also interfaces with the ASIC over an 8-bit bus, for example.

The video camera can be a charge coupled device (CCD) which captures images associated with the pictures. The analog information can be encoded by the transmitter in analog form and transmitted. Alternatively, the transmission can be digital where a suitable analog to digital converter (ADC) receives and digitally converts the analog video information from the CCD. Suitable actuators can be provided to physically control camera settings. For example, a lens opening control unit can be provided to adjust light levels to be received by the CCD. Further, a lens focusing unit can be used to automatically focus the images, based on information provided by one of the sensors. Further, the lens may be automatically switched with additional lens to provide different views. Additionally, the lens have one or optional filters to filter lights coming to the lens.

The above operations are controlled by a processor or an application specific integrated circuit (ASIC). In one embodiment, a processor is embedded and the processor can be a reduced instruction set computer (RISC) processor or a complex instruction set computer (CISC) processor. In one embodiment, the processor is a low power CPU such as the MC68328V DragonBall device available from Motorola Inc. The processor is connected to a read-only-memory (ROM) for receiving executable instructions as well as certain predefined data and variables. The processor is also connected to a random access memory (RAM) for storing various run-time variables and data arrays, among others. The RAM size is sufficient to store user application programs and data. In this instance, the RAM can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM for data back-up purposes.

It is to be understood that various terms employed in the description herein are interchangeable. Accordingly, the above description of the invention is illustrative and not limiting. Further modifications will be apparent to one of ordinary skill in the art in light of this disclosure. Thus, although primarily intended to be used in audio-visual environment such as camera-enabled cellular telephones or portable computers and PDAs, this invention is also applicable in any multimedia environment. Examples of such environment include but are not limited to software and games delivery systems, digital books and collaborative creation of documents. Moreover, although the invention has been discussed with reference to JPEG, a variety of different video coding standards, including MPEG-1, MPEG-2, MPEG-4, MPEG-7, H.261, and H.263, can be used as well.

The invention has been described in terms of specific examples which are illustrative only and are not to be construed as limiting. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs) or suitably programmed field programmable gate arrays (FPGAs).

While the preferred forms of the invention have been shown in the drawings and described herein, the invention should not be construed as limited to the specific forms shown and described since variations of the preferred forms will be apparent to those skilled in the art. Thus the scope of the invention is defined by the following claims and their equivalents.

What is claimed is:

1. An apparatus to transfer data between a first bus internal to a system-on-chip (SOC) device and a second bus external to the SOC device, each bus having a plurality of bus segments shared among a plurality of peripheral devices communicating over one or more bus segments, the apparatus comprising:
   a packing unit positioned between the first and second buses, the packing unit comprising:
      a flip-flop driving an effected first bus segment, and
      a multiplexer coupled to the flip-flop, the multiplexer receiving data from a plurality of second bus segments and adapted to enable the effected first bus data segment in sequence; and
   an unpacking unit positioned between the first and second buses, the unpacking unit comprising:
      a multiplexer, the multiplexer receiving data from a plurality of first bus segments and adapted to enable an effected first bus data segment in sequence; and
      a flip-flop coupled to the multiplexer to drive the effected second bus segment;
   wherein the packing and unpacking units utilize gated clocks for packing and unpacking of data, wherein the gated clock is enabled based on a target peripheral device's width, location, and the least significant bits of the address for the target peripheral device.

2. The apparatus of claim 1, wherein the flip-flop is a byte-wide flip-flop.

3. The apparatus of claim 1, wherein the packing unit further comprises a plurality of byte-wide flip-flops having outputs connected to each segment of the first bus.

4. The apparatus of claim 3, wherein each flip-flop is individually clocked.

5. The apparatus of claim 3, further comprising a plurality of multiplexers coupled to each segment of the second bus and adapted to move data from any byte of the second bus to any arbitrary byte on the first bus.

6. The apparatus of claim 1, wherein the unpacking unit further comprises a plurality of byte-wide flip-flops having outputs connected to each segment of the second bus.

7. The apparatus of claim 6, further comprising a plurality of multiplexers coupled to the plurality of flip-flops and adapted to move data from any byte of the first bus to the input of each flip-flop.

8. The apparatus of claim 1, wherein the unpacking unit writes to an 8-bit device that is arbitrarily connected to any byte of the second bus.

9. The apparatus of claim 1, wherein the unpacking unit writes to any 16-bit device that is connected to two consecutive bytes of the second bus.

10. A data transfer apparatus adapted to transfer data between a first bus internal to a system-on-clip (SOC) device and a second bus external to the SOC device, each bus having a plurality of bus segments shared among a plurality of peripheral devices communicating over one or more bus segments, the apparatus comprising:
   a packing unit positioned between the first and second buses, the packing unit adapted to enable each effected first bus data segment in sequence until requested data is packed; and
   an unpacking unit positioned between the first and second buses, the unpacking unit adapted to enable each effected second bus data segment in sequence until requested data is unpacked;
   wherein the packing and unpacking units utilize gated clocks for packing and unpacking of data, wherein the gated clock is enabled based on a target peripheral device's width, location, and the least significant bits of the address for the target peripheral device.

11. The apparatus of claim 10, wherein the unpacking unit conserves power by driving only an effected segment of the second bus.

12. The apparatus of claim 10, wherein the unpacking unit conserves the power by enabling a relative segment of the second bus, and holding the relative segment to transfer the captured data up-to the first bus's data width.

13. The apparatus of claim 10, wherein each bus comprises four data segments.

14. A method to transfer data between a first bus internal to a system-on-chip (SOC) device and a second bus external to the SOC device, each bus having a plurality of bus segments shared among a plurality of peripheral devices communicating over one or more bus segments, the method comprising:
   when reading data from the peripheral device, packing data by enabling each effected first bus data segment in sequence until requested data is packed;

when writing data to the peripheral device, unpacking data by enabling each effected second bus data segment in sequence until requested data is unpacked; and gating clock signals for packing and unpacking of data, wherein the gating further comprises enabling a flip-flop based on a target peripheral device's width, location, and the least significant bits of the address for the target peripheral device.

15. The method of claim 14, further comprising conserving power by driving only an effected data bus segment of the second bus.

16. The method of claim 14, further comprising conserving power by:

enabling a relative segment of the data bus, and holding the relative segment to transfer data up-to the first bus's data width.

\* \* \* \* \*